United States Patent [19]

Green et al.

[11] 4,329,194
[45] May 11, 1982

[54] METHOD FOR CONSTRUCTING FIBERGLASS ARTICLES

[75] Inventors: Andrew Green, Galveston; Charles W. Rogers, Hurst; Clarence D. Upton, Azle, all of Tex.

[73] Assignee: Composite Technology, Inc., Fort Worth, Tex.

[21] Appl. No.: 178,963

[22] Filed: Aug. 18, 1980

[51] Int. Cl.³ .......................... B32B 1/00; B32B 17/00
[52] U.S. Cl. ................................... 156/179; 156/221; 156/245; 156/310; 156/324; 156/462; 264/137; 264/258; 425/396
[58] Field of Search ............... 156/178, 179, 221, 222, 156/220, 219, 205, 206, 210, 182, 245, 516, 469, 462, 324, 310, 314; 264/258, 137, 119; 428/182, 184; 427/407.3, 434.2; 425/336, 395, 396, 369

[56] References Cited
U.S. PATENT DOCUMENTS 3,623,930 11/1971 Grosh .................................. 156/425
3,685,931 8/1972 Graven et al. ...................... 425/396
4,029,172 6/1977 Green .................................. 182/46

Primary Examiner—Michael W. Ball
Attorney, Agent, or Firm—James E. Bradley

[57] ABSTRACT

A method of constructing a fiberglass structure features that enable a gelcoat protective layer to be applied to an article formed in an automatic process. In the process, a web of fiberglass is drawn through a bath of structural resin to impregnate the fiberglass with the structural resin. A web of organic, porous veil material is drawn through a bath of gelcoat resin simultaneously with the structural resin impregnated web of fiberglass. The two webs are squeezed together, and the resin metered to provide a composite web having a layer of resin and a layer of gelcoat. A mold draws the composite web off of the rollers. Once a section has been drawn onto the mold, the web is sheared. Then the mold is moved into an oven for heating and curing the article.

16 Claims, 3 Drawing Figures

METHOD FOR CONSTRUCTING FIBERGLASS ARTICLES

BACKGROUND OF THE INVENTION

This invention relates in general to manufacturing fiberglass articles, and in particular to a method for manufacturing corrugated fiberglass panels with co-impregnated gelcoat.

The most common type of fiberglass panels are constructed by using short fiberglass filaments and a resin, then molding the resin into the shape of a corrugated panel in a continuous process. A disadvantage of this type of panel is that it lacks strength. Also, the sun deteriorates the resin, exposing the filaments to the elements. The filaments will allow seepage of moisture, eventually causing the panel to crack and disintegrate.

It is known that continuous fiberglass filaments combined with a layer of woven fiberglass filaments will add strength to an article. See, for example, U.S. Pat. No. 4,029,172. It is also known that a layer of gelcoat on top of the fiberglass filaments and resin will improve the resistance to sun damage. Gelcoat is also a fiberglass resin but contains a filler material and a pigment such as titanium dioxide to shield the structural resin from the sun. In the prior art, gelcoat has been sprayed on a forming tool or mold surface, and allowed to partially harden before application of the structural laminate. This has been necessary to prevent migration of the gelcoat resin into the structural resin or migration of the fiber to the sun exposed surface of the part. This operation is generally related to manual procedures and, therefore, is labor intensive.

Methods for incorporating a gelcoat which is distinct and of finite thickness over the glass laminate have not been developed save for the above method. Current corrugated panel production processes simply add fillers and pigments to the structural resin systems. This does resolve the UV protection problem, but it does not eliminate the migration of the glass fiber to the surface.

SUMMARY OF THE INVENTION

In this invention, a web of fiberglass is drawn through a bath of structural resin. Preferably this web has a layer of woven fiberglass and a layer of unidirectional filaments. A web of an organic porous material, known as veil, is applied to the structural laminate and simultaneously drawn through a bath of gelcoat. The gelcoat is formulated with particulate fillers which cannot easily pass through the veil, thus blocking migration of the gelcoat resin into the structural laminate. The organic veil prevents the glass fibers from migrating to the gelcoat surface. The two webs are drawn between rollers to make a composite web of uniform thickness. The web is then placed on a mold to shape it into the desired member and cured.

In the preferred embodiment, the mold moves linearly under the rollers to draw the web from the roller as the mold moves. Once the mold has received a section of the web, the web is sheared, then the mold is moved to a position under a press. The press has dies actuated by pneumatic cylinders for pressing the composite web into the mold. Then the mold is moved into an oven for heating to cure the composite.

DESCRIPTION OF THE PREFERRED EMBODIMENT

Figure 1:
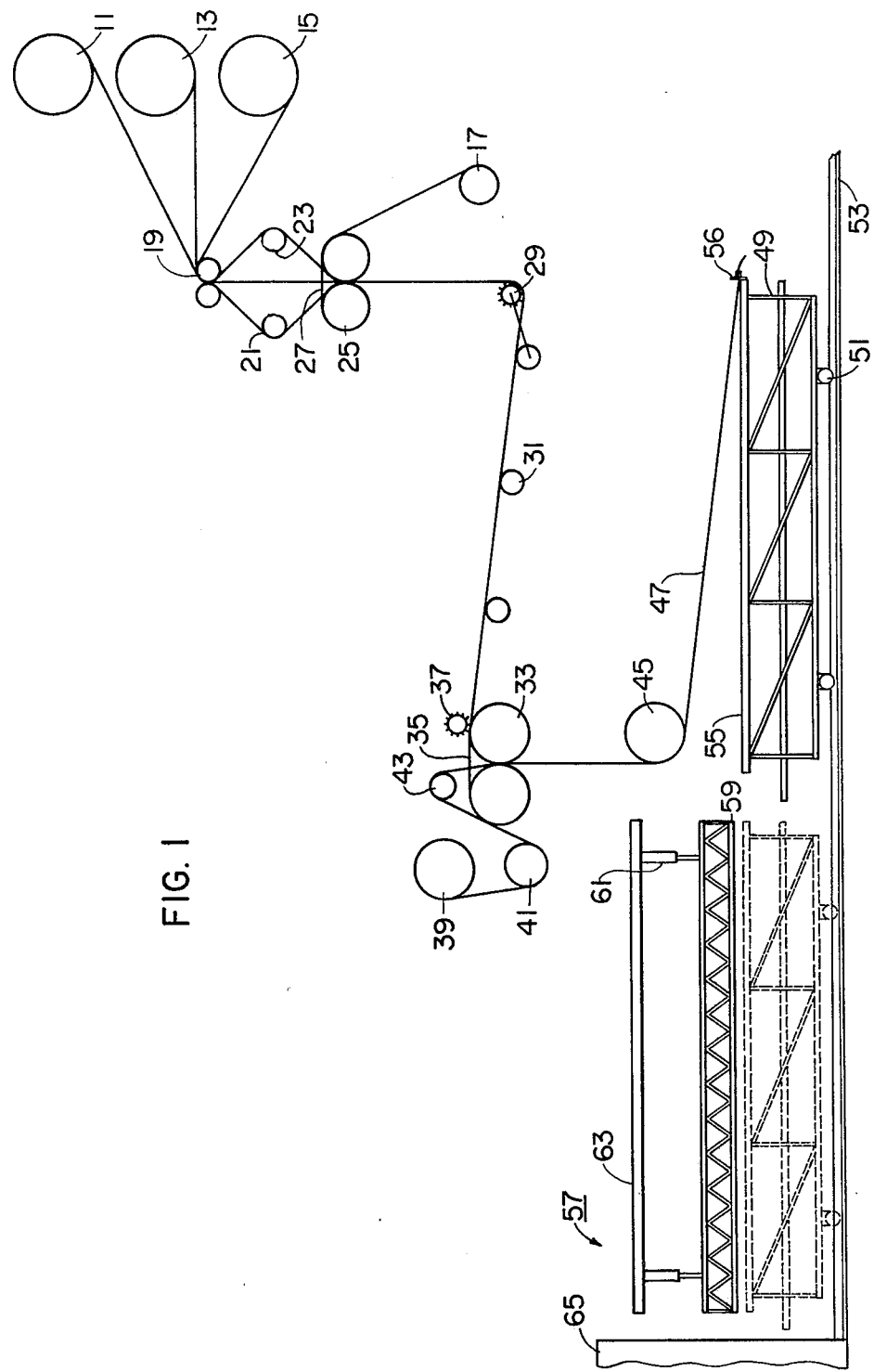
FIG. 1 is a schematic illustrating a method and apparatus used in forming fiberglass articles in accordance with this invention.

Referring to FIG. 1, the equipment for forming fiberglass articles includes a supply roll 11 of woven roving. Woven roving is a loose weave of fiberglass filaments. Normally, the weave consists of fiberglass filaments woven into a cross-hatched pattern, such as shown in U.S. Pat. No. 4,029,172. A supply roll 13 of unidirectional filaments is mounted below the woven roving roll 11. These filaments are all oriented in the same direction, parallel to the length of the web drawn from the roll 13. The filaments are pure fiberglass filaments ranging in size from about 20 to $50 \times 10^{-5}$ inch. Each filament is continuous for all practical purposes. The filaments are secured together loosely to maintain them in a flat web. There is only one layer of filaments in the web drawn from the supply roll 13. Another supply roll 15 of woven roving is mounted below the roll 13 of continuous filaments. The woven roving in supply roll 15 is identical to the woven roving of the supply roll 11.

A supply roll 17 of Mylar is mounted below the supply roll 15. Mylar is a trademark for a thermoplastic polyester film that is impermeable. It is a reaction product of terephthalic acid and ethylene glycol. Other suitable films include synthetic polymers such as polyvinylidene chloride film, polyethylene film, cellulose acetate film, and regenerated cellulose (cellophane).

A pair of pull rollers 19 are mounted in contact with each other and driven in opposite directions. Pull rollers 19 receive the webs from supply rolls 11, 13 and 15, and draw them from the rolls. A pair of rollers 21 are spaced apart and placed below the pull rollers. Woven roving web 11 passes around the roller 21 shown on the left side of the drawing. Woven roving web 15 passes around the roller 21 shown on the right side of the drawing. Unidirectional filament web 13 passes between the rollers 21, and is not contacted by either of the webs at this point.

A pair of resin rollers 25 are mounted below pull rollers 21. The resin rollers 25 are rotatably mounted a short distance apart from each other. The distance between them is equal to the desired thickness of the web after it passes between the rollers. Resin rollers 25 are driven in the preferred embodiment, although it is not essential. Each end of the resin rollers contains a plate 27 (only one shown) that is in the general shape of a triangle. Plate 27 seals against the cylindrical surfaces of the rollers and extends upwardly to the tops of the rollers. The two plates 27 combine with the rollers 25 to form a trough between the rollers.

Structural fiberglass resin is mixed with a catalyst and poured into the trough of resin rollers 25. The four webs 11, 13, 15 and 17, pass through the resin in the trough as they pass between the resin rollers 25. The Mylar web 17 passes over the right hand roller 25, as shown in the drawing, forming the backing of the composite web as it passes between the rollers 25.

A finned roller 29 containing longitudinal splines is located below the resin rollers 25. Finned roller 29 serves to expel air from between the webs. A plurality of guide rollers 31 are mounted laterally from the finned roller 29 for guiding the web toward a set of gelcoat rollers 33. Gelcoat rollers 33 are similar to the resin rollers 25. Rollers 33 are closely spaced from each other and are not driven. The distance between the rollers 33, at the closest point, equals the desired thickness of the web passing through the rollers. A plate 35 is mounted on each end of the rollers 33 for forming a trough to receive gelcoat resin.

The gelcoat resin is mixed with catalyst immediately prior to introduction into the trough. The gelcoat resin is filled with suitable particulate materials, and also contains ultraviolet stabilizer. In the preferred embodiment, both the structural resin and the gelcoat resin are marketed as Koppers FR6131. The gelcoat resin, differs from the structural resin in that it has 50 parts of calcium carbonate, aluminum trihydrate, or talc, for 100 parts of resin, plus a trace of silicate marketed under the name Cab-O-Sil, which is an irregularily shaped particle to help prevent resin migration. Also titanium dioxide and white pigment is added.

A finned roller 37 is mounted above one of the gelcoat rollers 33 for further expelling air bubbles. A supply roll 39 of Mylar is mounted adjacent to gelcoat rollers 33. Mylar roll 39 may be similar to Mylar roll 17, or it may be textured, since this material is on the upper surface of the completed articles. A supply roll of veil material 41, known as Nexus, is also mounted adjacent the gelcoat rollers 33. Veil 41 is preferably a nylon felt. It must be a thin, porous, organic material, and may be of various synthetic polymers, or even natural fibers.

The veil web 41 passes over a roller 43 and proceeds into the trough defined by the gelcoat rollers 33. The Mylar web 39 passes around the supply roll of veil 41, then directly over the left gelcoat roller 33, so that the Mylar web 39 is separated from the veil web 41 as they pass into the gelcoat resin. The Mylar web 39 does not pass over the roller 43. A guide roller 45 is mounted below the gelcoat rollers 33 for guiding the composite web 47, made up of webs 11, 13, 15, 17, 39 and 41.

Figure 2:
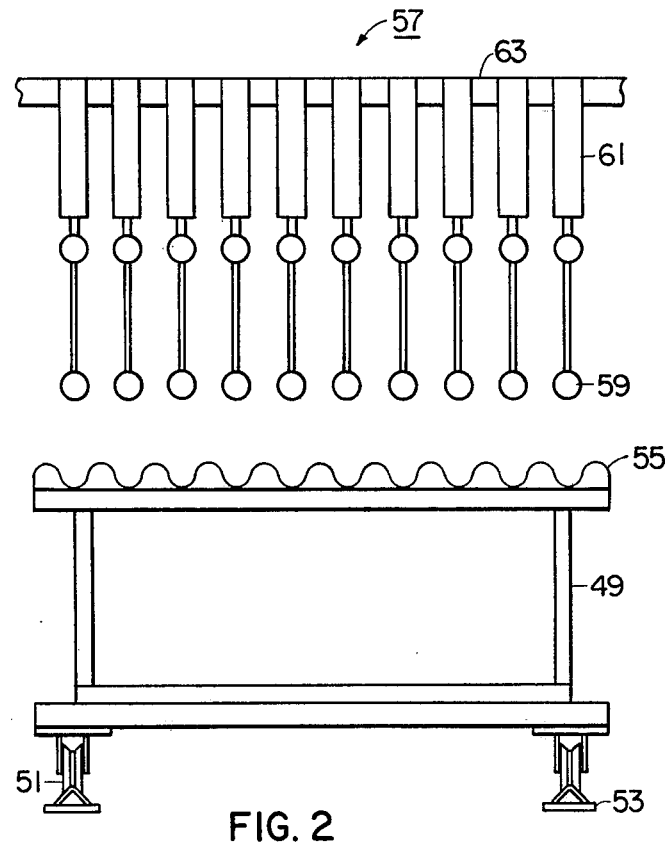
FIG. 2 is an end view of the mold and press portions of the equipment of FIG. 1.

A cart 49, mounted on wheels 51, rolls on rails 53 beneath the gelcoat rollers 33. Cart 49 has a mold 55 on its upper surface. Referring to FIG. 2 the mold 55 consists of a plurality of semicylindrical corregations for forming a corregated sheet of conventional shape. Semicylindrical depressions are spaced between identical portions in the mold. Cart 49 is driven by an air motor (not shown), that allows it to move along rail 53. Retaining means or a clamp 56 for retaining the leading edge of the web is mounted on the right end of cart 49. Clamp 56 consists of two plates that receive the web between them and are releasably clamped by various means. The clamp 56 is not shown in FIG. 2, for clarity.

Referring again to FIG. 1, a press 57 is mounted to one side of the gelcoat rollers 35. Press 57 is of the same length as the cart 49, which is the desired length of the panels to be formed. Press 57 includes a die 59. The die 59 consists of a plurality of cylindrical pipes, as shown in FIG. 2, each engaging one of the depression of the corregations of the mold 55. A number of pneumatic pistons 61 are mounted between the die 59 and a stationery support 63. Piston 61 moves the pipes of the die 59 in unison between an upper position, out of engagement with mold 55, to a lower position in which the die engages the mold 55. Approximately 100 psi (pounds per square inch) pressure, is supplied to the pistons, yielding a total force of approximately 4,000 pounds through 20 pistons and 10 pipes on the die 59.

An oven 65, shown partially in FIG. 1, is mounted over the rails 53 on the left side of the press 57. Oven 65 has heater elements for heating the section of composite web 47 on mold 55 to about 200° F. for 10 minutes.

In operation, structural resin and catalyst is placed between the resin rollers 25, and gelcoat resin and catalyst is placed between the gelcoat rollers 33. Pull rollers 19 are actuated to draw the woven roving webs 11 and 15 off of their supply rolls with the continuous filament web 15 sandwiched between them. The woven roving webs 11 and 15 are separated by the rollers 21 from the unidirectional web 13 to assure complete wetting in the bath. Then each are passed through the bath of structural resin. The Mylar backing web 17 is drawn over the right resin roller 25, thus one side of the Mylar will contact the bath. The web, at finned roller 29, thus consists of a Mylar web 17, a woven roving web 15, a continuous woven web 13, and the woven roving web 11, all squeezed together, and metered of excess resin. This assembly of webs is then fed over the guide rollers 31 and between the gelcoat rollers 33. The speed of travel and the distance from the resin rollers 25 to the gelcoat rollers 33 is selected to allow approximately one minute for the web to proceed from the resin rollers 25 to the gelcoat rollers 33. This allows soaking time to assure that all the webs are fully coated.

At the same time, the veil web 41, backed by the Mylar web 39 is brought into contact with the assembly of webs 11, 13, 15 and 17, at gelcoat rollers 33. The webs pass through the gelcoat bath between the gelcoat rollers 33, and are squeezed into contact with the fiberglass webs. One side of the upper woven roving web 11 will contact gelcoat and co-impregnate with veil web 41, then will be pressed into contact with veil 41. The composite web is squeezed into its desired dimension, which is typically 0.080 to 0.160 inch thick, then brought around guide roller 45.

The leading edge of the composite web 47 is clamped onto the leading edge of the cart 49 with clamp 56. Cart 49 is actuated to move linearly to the right, as shown in FIG. 1, drawing the web 47 through the various rollers, simultaneously with the driving means for the pull rollers 19. When sufficient composite web 47 has been drawn to extend the full length of the mold 55, the web is sheared just past guide roller 45 and laid on top of mold 55.

Then, the cart 49 moves to the left, as shown in dotted lines in FIG. 1, under press 57. Pull rollers 19 stop rotating while the cart 49 is out of its receiving position, with the web travel stopping also. When the cart 49 is located under its proper position, air pressure is supplied to the piston 61 to move the die 59 into engagement with the mold 55. This presses the section of composite web 47 into the proper shape.

Then the cart 49 moves into the oven 65. Up to this point, the layer of structural resin and gelcoat resin have not cured and thus are still liquid. The veil 41 prevents excessive migration of the gelcoat down into the lighter structural resin. The 200° F. heat for 10 minutes cures the gelcoat and structural resin layers simultaneously. The layers polymerize together and chemically bond with each other, forming intermolecular linking during the heating process. After cooling, the article is then removed from the mold and the process is repeated.

Figure 3:
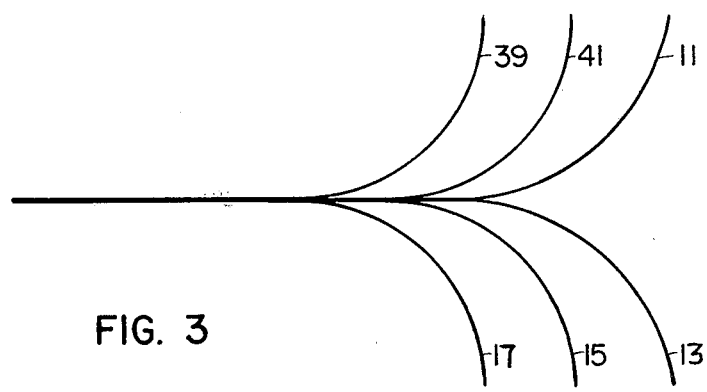
FIG. 3 is a schematic side view of the composite web formed by the apparatus of FIG. 1, with the various layers shown spread apart.

FIG. 3 is a schematic view representing the various layers in the article after curing. The top layer is the Mylar layer 39. The next downward layer is the veil layer 41, and gelcoat resin. This layer is about 0.015 to 0.020 inch thick in a composite web 0.095 inches thick. The next downward layer is the woven roving layer 11. The next layer is the unidirectional filament layer 13. The next downward layer is the woven roving layer 15. The bottom layer is the Mylar layer 17. In use, the Mylar layers may either be pulled off, or they may remain on the panels. Agents can be used for bonding the Mylar layers 39 and 17 to the composite structure, if desired.

The invention has several advantages. The resulting article is a strong article because of its unidirectional filaments combined with the woven filaments, resisting tension and shear forces. The gelcoat layer protects the resin and fiberglass filaments from the effects of the sun. The article is formed in a much faster process than manually handlaying various layers. The gelcoat coimpregnation of a veil web with a structural resin impregnated fiberglass web assures that the structural laminate will be protected from weathering. Using a movable mold that draws a web, and then passes under a press, speeds up the operation.

While the invention has been shown in only one of its forms, it should be apparent to those skilled in the art that it is not so limited but is susceptible to various changes and modifications without departing from the spirit thereof. We claim:

1. A method of constructing a fiberglass member, comprising:
   drawing a web of fiberglass through a bath of structural resin to impregnate the fiberglass with the structural resin;
   drawing a web of organic, porous veil material through a bath of gelcoat resin containing ultraviolet stabilizer and pigment, simultaneously with the structural resin impregnated web of fiberglass, and pressing the webs of the veil material and fiberglass together to create a composite web having a layer of structural resin and a layer of gelcoat resin; then
   placing the composite web on a mold to shape the member, then curing.

2. The method according to claim 1 wherein the web of fiberglass comprises a web of unidirectional fiberglass filaments and at least one web of woven fiberglass.

3. The method according to claim 1 wherein the web of veil material comprises a fibrous thermoplastic felt.

4. The method according to claim 1 wherein a catalyst is introduced into the bath of structural resin, and a catalyst is introduced into the bath of gelcoat resin.

5. The method of claim 1 wherein the web of structural resin impregnated fiberglass passes for a selected time in air before reaching the bath of gelcoat resin to allow time for soaking.

6. The method according to claim 1 wherein the web of structural resin impregnated fiberglass passes through a set of rollers prior to reaching the bath of gelcoat resin to meter the thickness of the web.

7. The method according to claim 1 wherein the web is pressed tightly into the mold with a die.

8. A method of constructing a fiberglass member, comprising:
   mounting a pair of rotatable resin rollers closely spaced to each other and closing part of each end of each roller to define a trough on the upper side of the resin rollers;
   placing in the trough of the resin rollers fiberglass structural resin and catalyst;
   drawing through the resin rollers a web of unidirectional fiberglass filaments and at least one web of woven fiberglass, backed with a web of impermeable thermoplastic film, to impregnate the fiberglass webs with structural resin;
   mounting a pair of rotatable gelcoat rollers closely spaced to each other and closing part of each end of the gelcoat rollers to define a trough on the upper side of the gelcoat rollers;
   placing in the trough of the gelcoat rollers fiberglass gelcoat resin containing ultraviolet stabilizer and pigment;
   drawing through the gelcoat rollers a web of permeable organic fibrous veil material, backed by a web of impermeable thermoplastic film, while simultaneously drawing the structural resin impregnated fiberglass webs through the gelcoat rollers, creating a composite web with a layer of structural resin and a layer of gelcoat resin; and
   placing the composite web on a mold to shape the member and curing the web.

9. The method according to claim 8 further comprising the step of pressing a die into the mold over the composite web to shape the member.

10. The method according to claim 9 further comprising the step of heating the composite web after it has been pressed by the die into the mold, to cure the member.

11. The method according to claim 8 further comprising the step of shearing the composite web after placing it into the mold.

12. The method according to claim 8 further comprising separating the web of woven fiberglass and unidirectional fiberglass as they pass through the trough of the structural resin, until passing between the resin rollers.

13. A method of constructing a fiberglass member, comprising:
   mounting a pair of rotatable resin rollers close to each other and closing a part of each end of the resin rollers to define a trough on the upper side of the resin rollers;
   placing in the trough of the resin rollers structural fiberglass resin and catalyst;
   drawing through the resin rollers a web of unidirectional fiberglass filaments and a web of woven fiberglass filaments, backed by a web of impermeable thermoplastic film, to impregnate the webs of fiberglass with structural resin;
   mounting a pair of rotatable gelcoat rollers close to each other and closing part of each end of the gelcoat rollers to define a trough on the upper side of the gelcoat rollers;
   placing in the trough of the gelcoat rollers fiberglass gelcoat resin containing ultraviolet stabilizer and pigment;
   drawing through the gelcoat rollers a web of permeable organic fibrous veil material, backed by a web of impermeable thermoplastic film, while simultaneously drawing the structural resin impregnated web through the gelcoat rollers, creating a composite web with a layer of structural resin and a layer of gelcoat resin;
   securing the leading edge of the composite web to a mold, then moving the mold linearly under the gelcoat rollers to draw a section of the composite web onto the mold;

shearing the composite web section from the composite web, and moving the mold linearly until under a press having a die;

pressing the die into the mold to shape the member; then moving the mold into an oven and heating the member for curing.

14. An apparatus for making fiberglass members, comprising in combination:

a pair of resin rollers, having ends partially closed for defining a trough for receiving fiberglass structural resin;

a pair of gelcoat rollers, having ends partially closed for defining a trough for receiving fiberglass gelcoat resin;

means for drawing at least one web of fiberglass through the resin rollers;

means for drawing a web of veil through the gelcoat rollers along with the web of fiberglass after it has passed through the resin rollers;

a press mounted adjacent the gelcoat rollers, the press having a die and means for moving the die vertically;

a mold having transport means for passing beneath the gelcoat rollers and beneath the press for receiving the die; and an oven adjacent the press for receiving and heating the mold.

15. The apparatus according to claim 11 wherein the mold comprises a plurality of corregations, and the die domprises a plurality of mating members having semi-cylindrical lower surfaces, to form a corregated sheet fiberglass member.

16. The apparatus according to claim 11, further comprising securing means mounted on the front of the mold for securing the impregnated web to the mold to draw it onto the mold.

* * * * *